(12) United States Patent
Saito et al.

(10) Patent No.: US 9,991,499 B2
(45) Date of Patent: Jun. 5, 2018

(54) BATTERY

(71) Applicants: Taira Saito, Miyoshi (JP); Masato Kamiya, Anjo (JP); Junpei Terashima, Toyota (JP); Ayumu Kamakura, Toyota (JP); Shinji Suzuki, Kariya (JP)

(72) Inventors: Taira Saito, Miyoshi (JP); Masato Kamiya, Anjo (JP); Junpei Terashima, Toyota (JP); Ayumu Kamakura, Toyota (JP); Shinji Suzuki, Kariya (JP)

(73) Assignees: TOYOTA JIDOSHA KABUSHIKI KAISHA, Toyota-shi, Aichi (JP); KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 273 days.

(21) Appl. No.: 14/762,640

(22) PCT Filed: Jan. 29, 2013

(86) PCT No.: PCT/JP2013/051824
§ 371 (c)(1),
(2) Date: Jul. 22, 2015

(87) PCT Pub. No.: WO2014/118873
PCT Pub. Date: Aug. 7, 2014

(65) Prior Publication Data
US 2015/0325832 A1    Nov. 12, 2015

(51) Int. Cl.
*H01M 2/26* (2006.01)
*H01M 2/30* (2006.01)
(Continued)

(52) U.S. Cl.
CPC .......... *H01M 2/263* (2013.01); *H01M 2/305* (2013.01); *H01M 10/0525* (2013.01);
(Continued)

(58) Field of Classification Search
CPC ... H01M 2/0217; H01M 2/0473; H01M 2/263
(Continued)

(56) References Cited

U.S. PATENT DOCUMENTS

2007/0117009 A1    5/2007 Yamauchi et al.
2008/0241687 A1   10/2008 Ishii et al.
(Continued)

FOREIGN PATENT DOCUMENTS

JP          3551365 B2     8/2004
JP       2008-251256 A    10/2008
(Continued)

*Primary Examiner* — Basia Ridley
*Assistant Examiner* — James Erwin
(74) *Attorney, Agent, or Firm* — Sughrue Mion, PLLC

(57) ABSTRACT

A flat electrode body of a battery has a first-side curved end positioned on a first side of an electrode body width direction and a second-side curved end positioned on a second side. A positive electrode innermost curved portion of a positive electrode sheet is disposed inside the first-side curved end. When the dimension from a positive electrode connecting portion to the end on the first side of the electrode body is defined as a distance and the dimension from the positive electrode connecting portion to the end on the second side of the electrode body is defined as a distance, the positive electrode connecting portion being in the positive electrode protrusion wound portion and connected to a terminal connecting portion of a positive terminal member, the terminal connecting portion is connected to the positive electrode connecting portion at a position satisfying the condition $Ha \geq 1.1 Hb$.

17 Claims, 7 Drawing Sheets

(51) Int. Cl.
  *H01M 10/0525* (2010.01)
  *H01M 2/04* (2006.01)
  *H01M 2/02* (2006.01)

(52) U.S. Cl.
  CPC ........ *H01M 2/0217* (2013.01); *H01M 2/0473* (2013.01); *H01M 2220/20* (2013.01); *Y02E 60/122* (2013.01); *Y02T 10/7011* (2013.01)

(58) Field of Classification Search
  USPC .......................................................... 429/94
  See application file for complete search history.

(56) References Cited

U.S. PATENT DOCUMENTS

2011/0195287 A1    8/2011  Kamifuji et al.
2013/0071710 A1 *  3/2013  Saito ................ H01M 10/0431
                                                     429/94

FOREIGN PATENT DOCUMENTS

| JP | 2010-49967 A | 3/2010 | |
| JP | 2010129450 A | 6/2010 | |
| JP | 2011-165515 A | 8/2011 | |
| JP | 2012-174490 A | 9/2012 | |
| WO | WO 2011145205 A1 * | 11/2011 | ........ H01M 10/0431 |

* cited by examiner

BATTERY

CROSS-REFERENCE TO RELATED APPLICATIONS

This is a National Phase application based on the PCT International Patent Application No. PCT/JP2013/051824 filed on Jan. 29, 2013, the entire contents of which are incorporated herein by reference.

TECHNICAL FIELD

The present invention relates to a battery provided with an electrode body in which a positive electrode sheet and a negative electrode sheet, each of which has a strip shape, are overlapped by interposing separators therebetween and wound about an axis in a flat shape, and a positive terminal member connected to a positive-electrode protruding wound part located on a first side in an axial direction of the electrode body.

BACKGROUND ART

Heretofore, there is known an electrode body of a battery or cell, in which a strip-shaped positive electrode sheet and a strip-shaped negative electrode sheet are overlapped by interposing strip-shaped separators made of porous resin therebetween and wound together about an axis in a flat shape. This electrode body has a positive-electrode protruding wound part whose edge portion on one side in a width direction of the positive electrode sheet protrudes in a spiral form from the separators on a first side in the axial direction. To this positive-electrode protruding wound part, a terminal connecting portion of a positive terminal member of the battery is connected by welding or another technique. For instance, there is disclosed a battery provided with such a flat wound electrode body and a terminal member (see FIGS. 1 to 3 of Patent Document 1, and others).

RELATED ART DOCUMENTS

Patent Documents

Patent Document 1: Japanese patent application publication No. 2008-251256

SUMMARY OF INVENTION

Problems to be Solved by the Invention

Regarding the flat wound electrode body, if this electrode body abnormally generates heat due to overcharge or the like, a short circuit is most likely to occur between an innermost curved portion (a positive-electrode innermost curved portion), curved at a smallest radius of curvature (a largest curvature), of the positive electrode sheet and a negative electrode sheet facing this curved portion. This is because of the following reasons. Specifically, in a wound electrode body, heat is more likely to increase in a portion located more inside in a radial direction. In the electrode body, a section apt to cause a short circuit is a portion in which the positive electrode sheet and the negative electrode sheet face each other via the separators. Thus, except for so-called dead turn portions of the negative electrode sheet and the separator located on a more inside in a radial direction than the above section, the above-described positive-electrode innermost curved portion and the negative electrode sheet facing this curved portion are located on a radially innermost side. Thus, the temperature increases the most near the positive-electrode innermost curved portion.

The separators thermally shrinks or contracts as the temperature rises. Thus, an opposed portion of the separator facing the positive-electrode innermost curved portion thermally shrinks in the separator width direction (an axial direction of the electrode body) and decreases in dimension. When this shrinkage greatly occurs, the separator may become absent in some portions between the positive-electrode innermost curved portion and the opposed negative electrode sheet thereto, so that the positive electrode sheet (its innermost curved portion) contacts the negative electrode sheet, causing a short circuit.

In addition, even when a battery is used under a load applied in a thickness direction of the battery (in a thickness direction of the flat wound electrode body), the load (surface pressure) is less applied on the separators in both curved portions of the electrode body at both ends in the width direction (a first-side curved end part and a second-side curved end part), so that the separators are liable to move and the separators are apt to largely shrink due to heat. Particularly, on a radially inside of an innermost circumferential portion of the positive electrode sheet, of each of the curved parts at both ends in the electrode body width direction (the first-side curved end part and the second-side curved end part), there is no overlapping portion of the positive electrode sheet and the negative electrode sheet. Thus, it is conceived to cause movement of the separators facing the innermost circumferential portion and large heat shrinkage of the separators.

When the heat conductivity of the positive electrode sheet is lower than that of the negative electrode sheet, e.g., when a positive electrode foil of the positive electrode sheet is made of aluminum and a negative electrode foil of the negative electrode sheet is made of copper, relative heat decrease in the positive electrode sheet is poor, so that the temperature on a side where a positive electrode foil protrudes in the axial direction (a positive-electrode protruding wound part side) becomes higher than on the other side. Accordingly, the separators greatly thermally shrink in the width direction (the axial direction of the electrode body) on the positive-electrode protruding wound part side of the electrode body. This may cause the positive electrode sheet and the negative electrode sheet to contact each other, generating a short circuit therebetween. That is, when the flat wound electrode body abnormally generates heat, a short circuit is most likely to occur in a positive-electrode protruding wound part side of the positive-electrode innermost curved portion (a first side in the axial direction).

It is further found that, if the electrode body abnormally generates heat, as a positive-electrode connecting portion of the positive-electrode protruding wound part connected to the terminal connecting portion of the terminal member is located closer to the positive-electrode innermost curved portion, a short circuit is more likely to occur in the positive-electrode innermost curved portion. This is conceivably because of the following reasons. Specifically, when the terminal connecting portion of the positive terminal member is to be connected by welding or the like to the positive-electrode protruding wound part of the electrode body to form the positive-electrode connecting portion, if the edge portion of the positive electrode sheet forming the positive-electrode protruding wound part are pressed in the thickness direction and bound in a bundle, stress will act on the separators, causing the separators to be pulled in a longitudinal direction toward the positive-electrode connecting portion. Therefore, if the positive-electrode innermost curved portion is present near the positive-electrode connecting portion, large stress (tensile stress acting on the separators in the longitudinal direction) is generated in the separators (especially, on a side close to the positive-electrode protruding wound part in the axial direction of the electrode body) facing the positive-electrode innermost curved portion. Such a stress-generated portion of the separator will shrink to remove the stress and return to a previous state before drawing as the temperature increases. It is consequently considered that, if this shrinkage is large, the positive-electrode innermost curved portion of the positive electrode sheet (especially, on a side close to the positive-electrode protruding wound part in the axial direction of the electrode body) and the opposed negative electrode sheet thereto may contact each other, resulting in the occurrence of a short circuit.

The present invention has been made in view of the circumstances and has a purpose to provide a battery capable of appropriately preventing a short circuit from occurring in a positive-electrode innermost curved portion on a positive-electrode protruding wound part side of a flat wound electrode body (on a first side in an axial direction) in case the electrode body abnormally generate heat.

Means of Solving the Problems

To achieve the above purpose, one aspect of the invention provides a battery comprising: an electrode body including a strip-shaped positive electrode sheet and a strip-shaped negative electrode sheet having higher heat conductivity than the positive electrode sheet, the positive electrode sheet and the negative electrode sheet being overlapped and wound about an axis in a flat shape by interposing strip-shaped separators made of porous resin between the positive and negative electrode sheets, the electrode body having a positive-electrode protruding wound part that is formed of an edge portion of the positive electrode sheet on one side in a width direction and protrudes in a flat spiral form toward a first side in an axial direction; and a positive terminal member having a terminal connecting portion connected to the positive-electrode protruding wound part of the electrode body, wherein the electrode body being flat, includes: a first-side curved end part located on a first side in an electrode body width direction intersecting the axial direction and an electrode body thickness direction, and formed of the positive electrode sheet, the negative electrode sheet, and the separators which are bent in a semi-cylindrical shape and overlapped one on another; and a second-side curved end part located on a second side in the electrode body width direction and formed of the positive electrode sheet, the negative electrode sheet, and the separators which are bent in a semi-cylindrical shape and overlapped one on another, wherein the positive electrode sheet includes a positive-electrode innermost curved portion bent at smallest radius curvature and placed in the first-side curved end part, when a dimension in the electrode body width direction from a positive-electrode connecting portion of the positive-electrode protruding wound part connected to the terminal connecting portion to an end of the first-side curved end part of the electrode body on the first side in the electrode body width direction is defined as a distance Ha, and a dimension in the electrode body width direction from the positive-electrode connecting portion to an end of the second-side curved end part of the electrode body in the electrode body width direction is defined as a distance Hb, the terminal connecting portion is connected to the positive-electrode connecting portion at a position where the distance Ha and the distance Hb satisfy a relation of Ha≥1.1Hb.

According to the above battery, in case the flat wound electrode body abnormally generates heat, a portion of the electrode body in which a short circuit is most likely to occur, that is, a positive-electrode innermost curved portion on a positive-electrode protruding wound part side (on a first side in an axial direction), can be appropriately prevented from causing a short circuit.

Furthermore, the above-described battery, preferably, further comprises a battery case accommodating the electrode body and having a terminal fixing wall part to which the positive terminal member is fixed and extended through to outside, wherein the electrode body is accommodated in the battery case in a configuration that the electrode body width direction intersects the terminal fixing wall part and the second-side curved end part is located on a side closer to the terminal fixing wall part than the first-side curved end part.

Furthermore, in any one of the above-described batteries, preferably, the distance Ha and the distance Hb satisfy a relation of Ha≤2.5Hb.

Furthermore, in the above-described battery, preferably, when a dimension of a central part of the electrode body in the electrode body width direction, the central part being located between the first-side curved end part and the second-side curved end part, is defined as a dimension He, and a dimension of the positive-electrode connecting portion in the electrode body width direction is defined as a dimension Hc, the dimension Hc is a value meeting a relation of Hc≤0.5He.

Furthermore, in any one of the above-described batteries, preferably, when a thickness of the electrode body is a thickness Wa, the distance Ha and the distance Hb satisfy a relation of Ha≥Wa and Hb≥Wa.

Furthermore, in any one of the above-described batteries, preferably, the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

MODE FOR CARRYING OUT THE INVENTION

Figure 1:
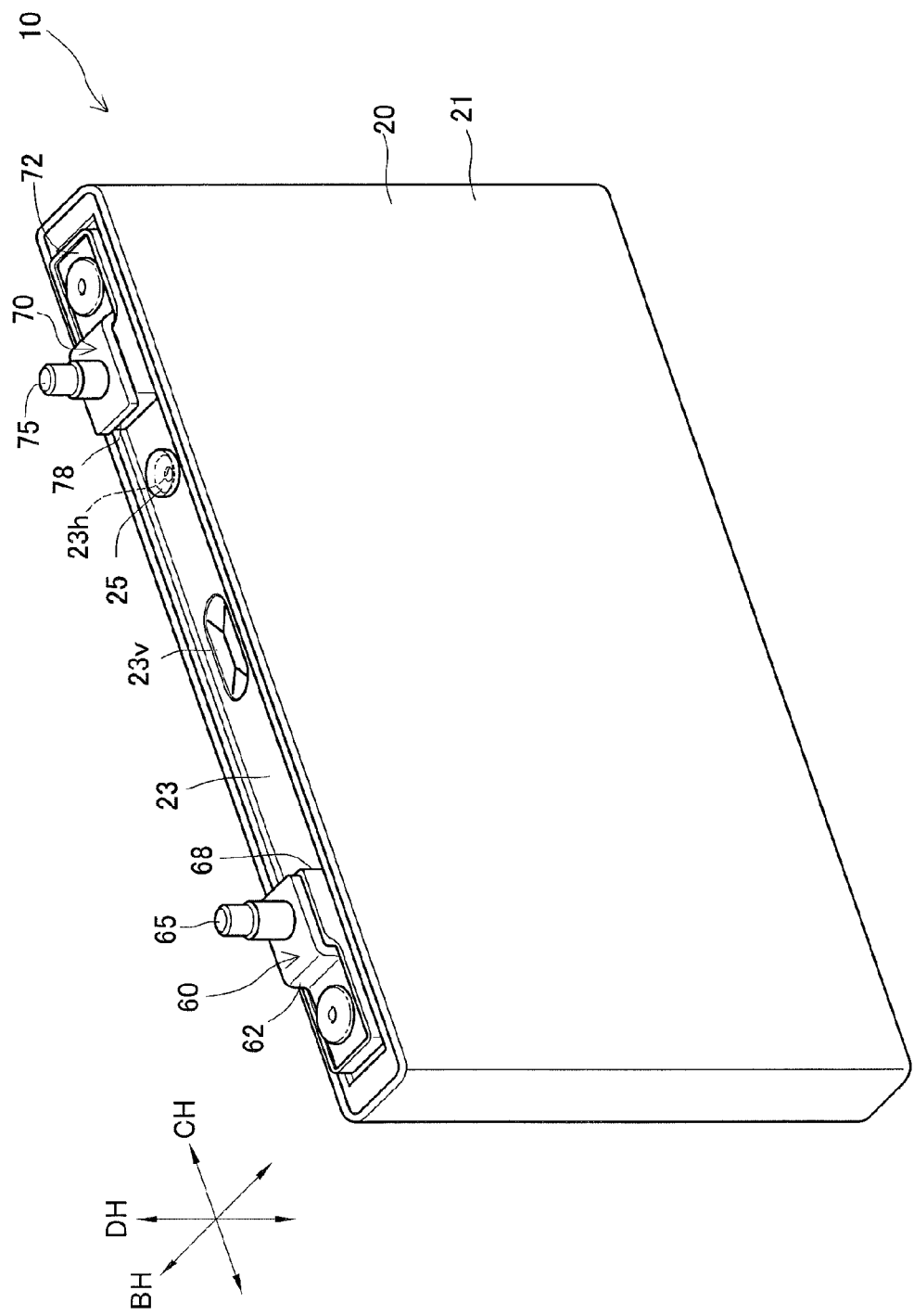
FIG. 1 is a perspective view of a battery of an embodiment.
Figure 2:
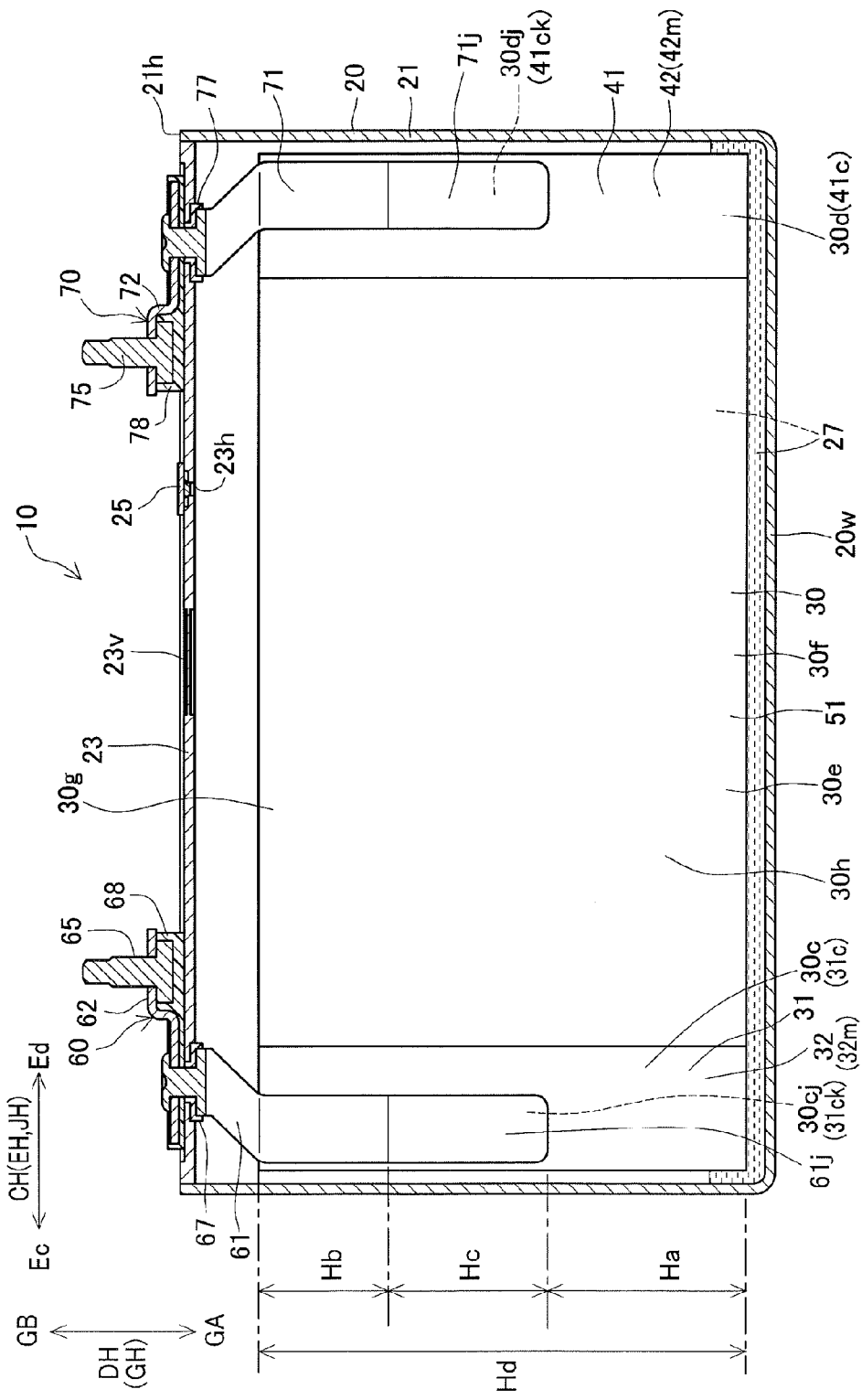
FIG. 2 is a vertical cross sectional view of the battery of the embodiment.
Figure 3:
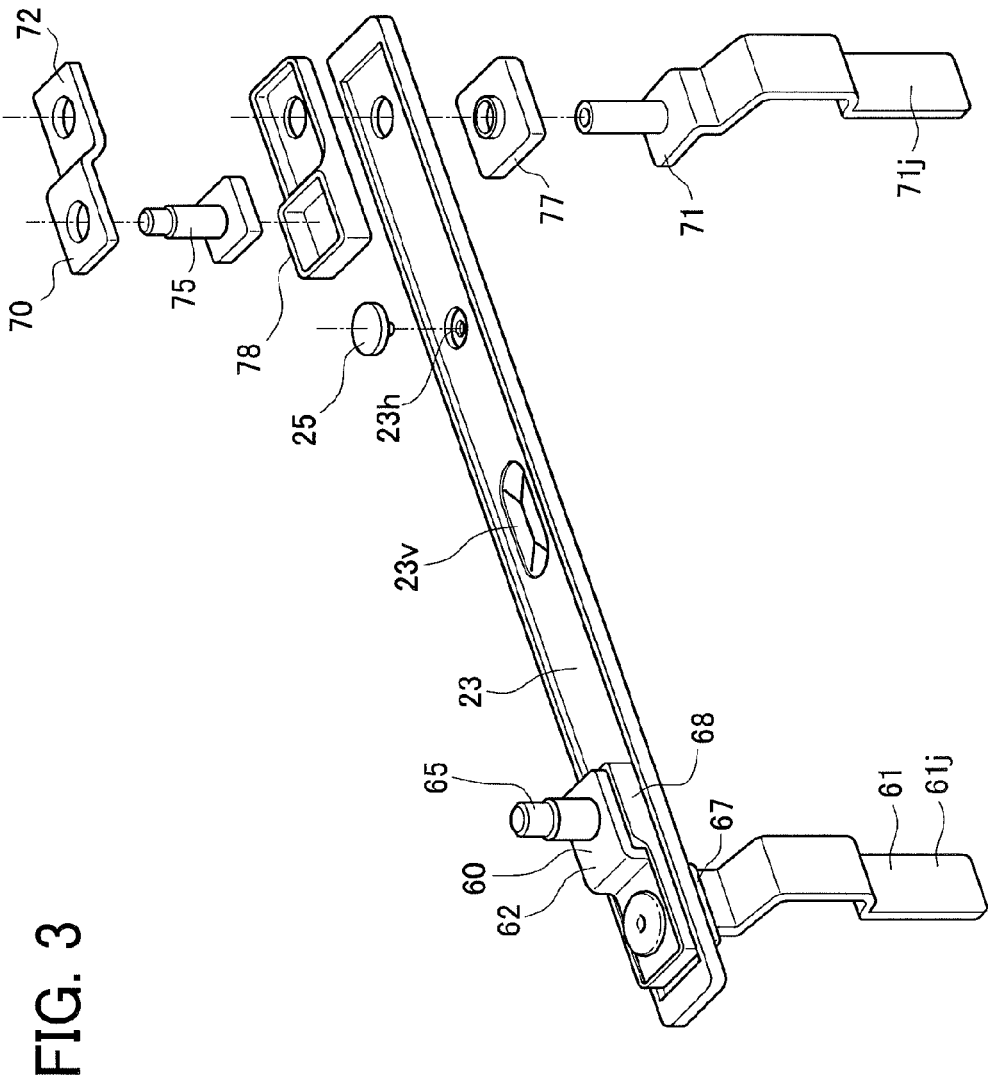
FIG. 3 is an exploded perspective view of a lid member, a positive terminal member, a negative terminal member, and others in the embodiment.
Figure 4:
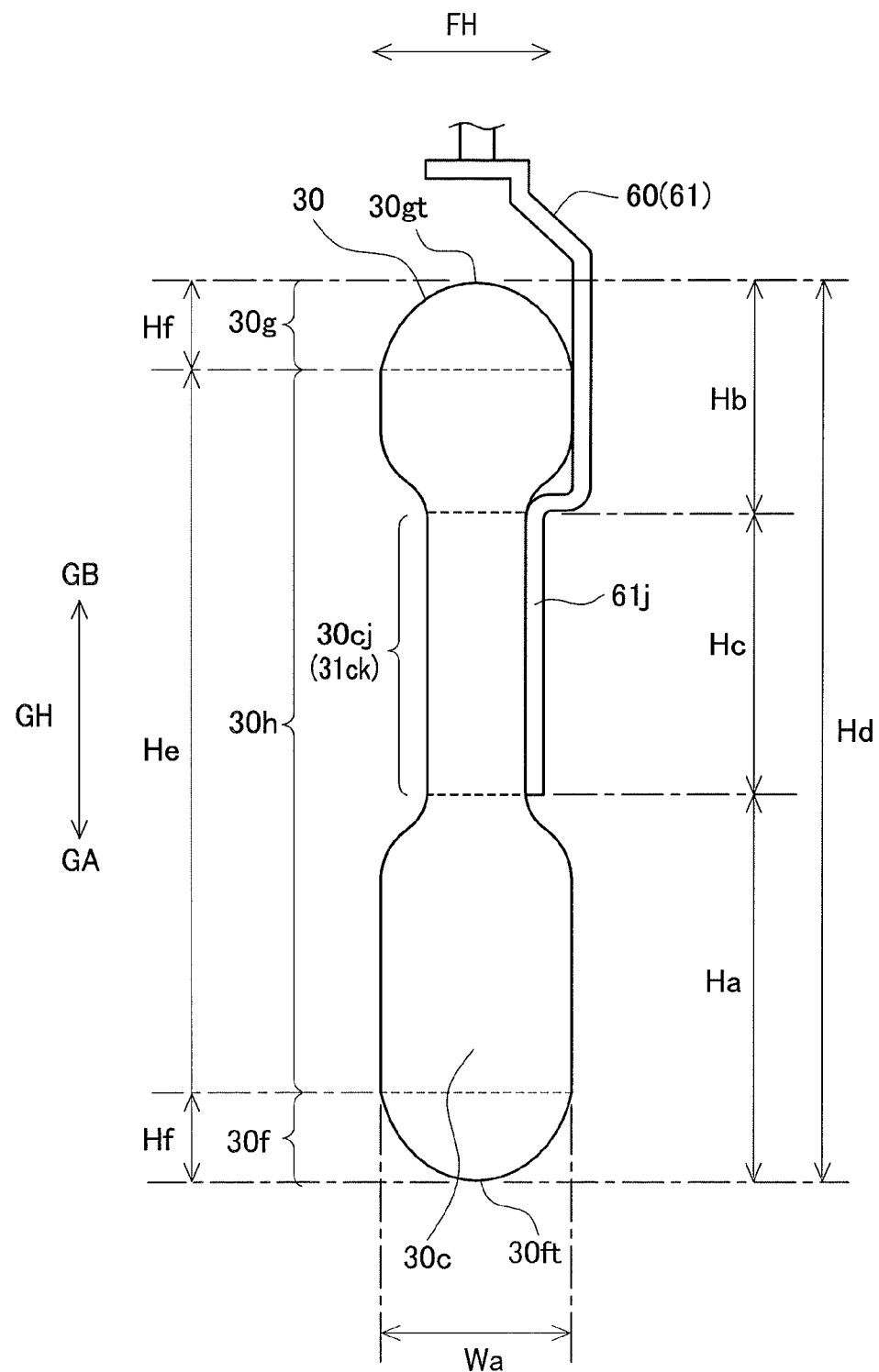
FIG. 4 is a plan view of an electrode body and the terminal member seen from an axial direction in the embodiment.
Figure 5:
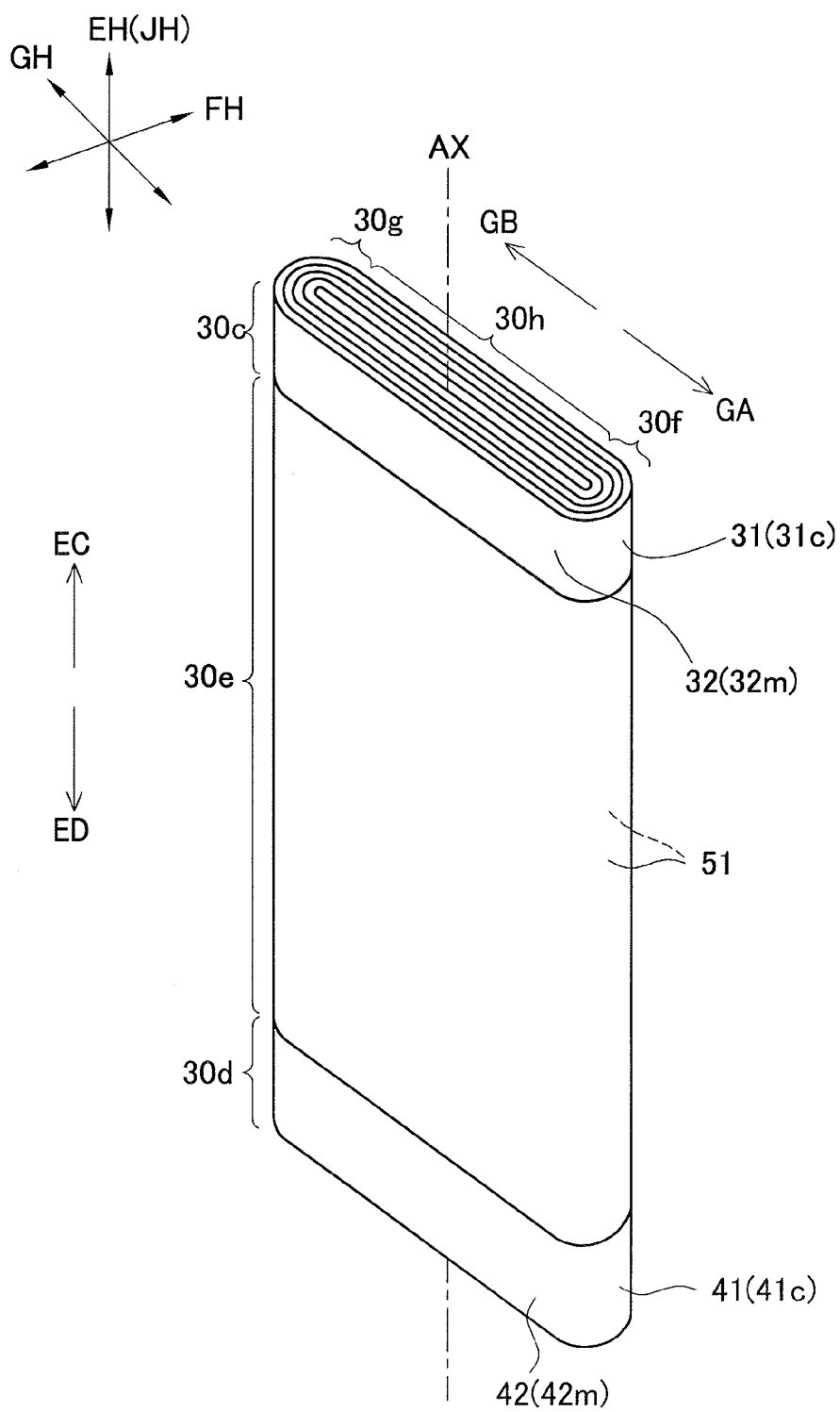
FIG. 5 is a perspective view of the electrode body in the embodiment.
Figure 6:
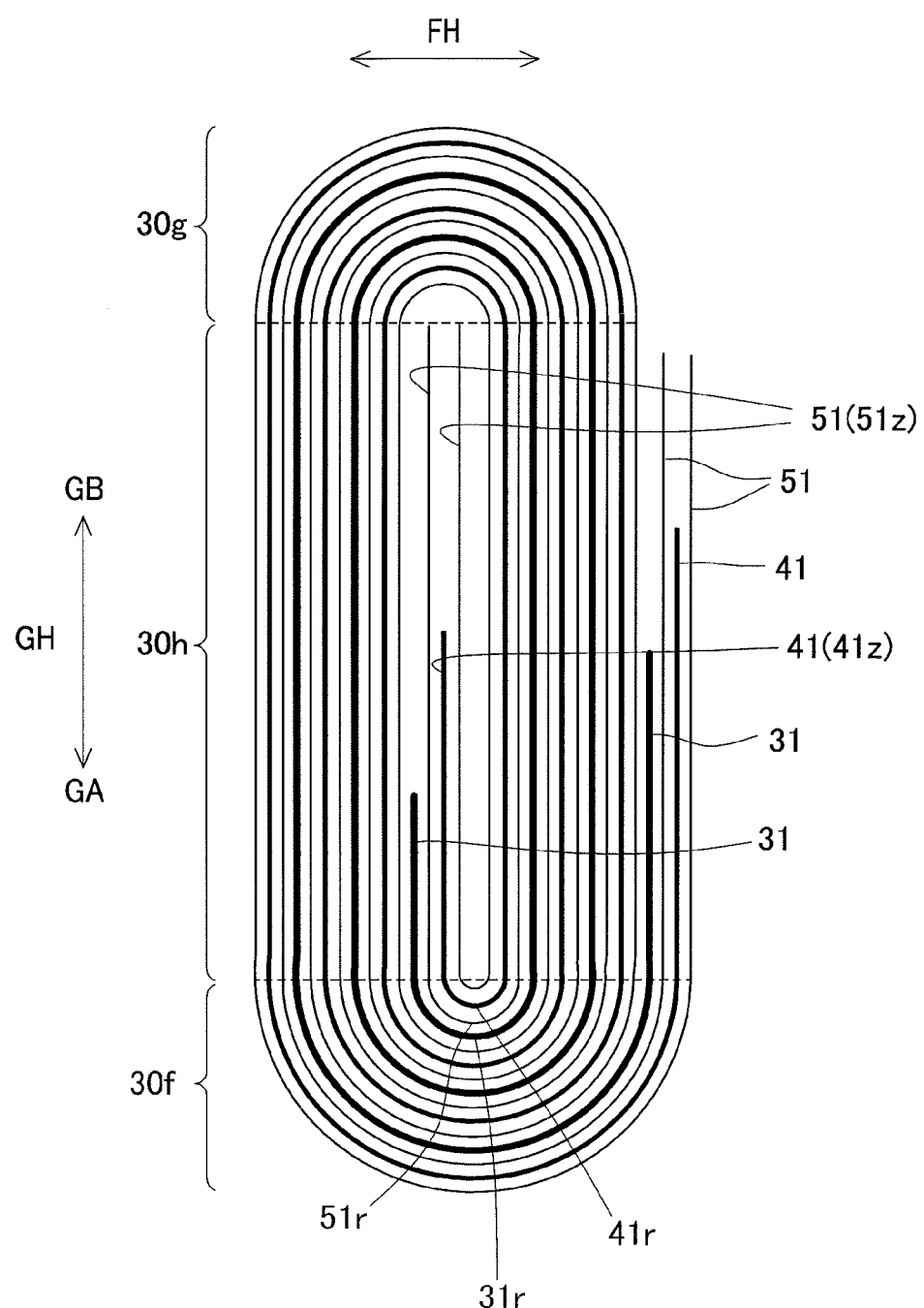
FIG. 6 is an explanatory view schematically showing arrangement of a positive electrode sheet, a negative electrode sheet, and separators of the electrode body seen from above in FIG. 5 in the embodiment.
Figure 7:
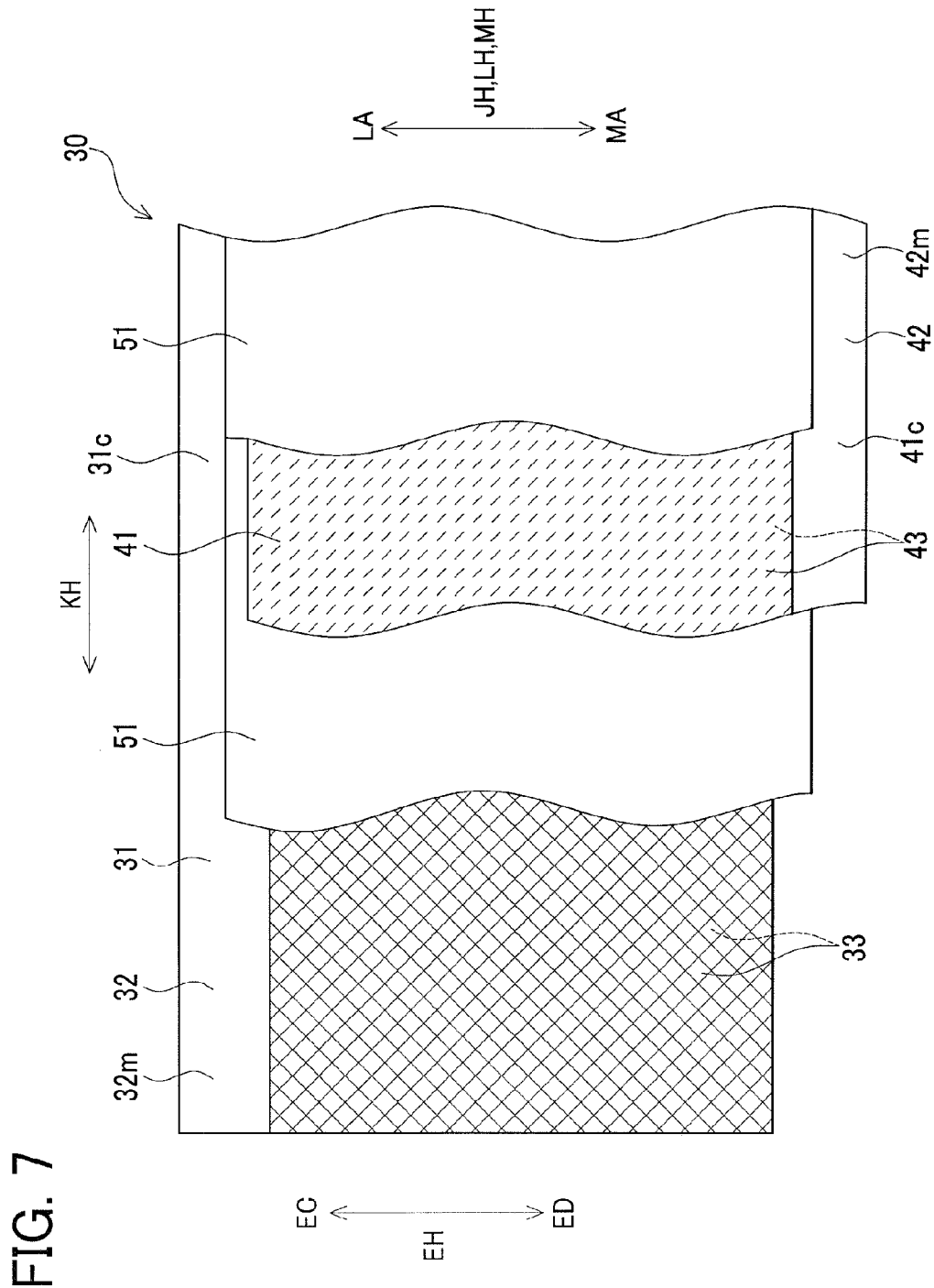
FIG. 7 is a development view of the electrode body showing the positive electrode sheet and the negative electrode sheet overlapping each other through the separators in the embodiment.

A detailed description of an embodiment of the present invention will now be given referring to the accompanying drawings. FIGS. 1 and 2 show a battery 10 of the present embodiment. FIG. 3 shows a lid member 23, a positive terminal member 60, a negative terminal member 70, and others. FIG. 4 shows an electrode body 30 and the positive terminal member 60 connected thereto. FIGS. 5 to 7 show the electrode body 30 and its developed view. The following explanation is made on the assumption that a battery thickness direction BH of the battery 10, a battery lateral direction CH, and a battery vertical direction DH are defined as indicated in FIGS. 1 and 2. Also, an axial direction EH of the electrode body 30, an electrode body thickness direction FH, and an electrode body width GH are defined as indicated in FIGS. 2, 4 to 6.

This battery 10 is a rectangular sealed lithium ion secondary battery to be mounted in a vehicle such as a hybrid vehicle and an electric vehicle. This battery 10 includes a rectangular parallelepiped battery case 20, the flat wound electrode body 30 accommodated in this battery case 20, the positive terminal member 60 and the negative terminal member 70 each supported in the battery case 20, and others. In the battery case 20, furthermore, a non-aqueous electrolyte 27 is stored.

The battery case 20 is made of metal (concretely, aluminum). This battery case 20 includes a bottom-closed rectangular tubular case body 21 having a rectangular opening 21h only on the upper side, and a rectangular plate-like lid member (a terminal fixing wall part) 23 closing the opening 21h of the case body 21 (see FIGS. 1 to 3). Of the lid member 23, a portion near the center in a longitudinal direction (the battery lateral direction CH) is provided with a non-return safety valve 23v. Near this safety valve 23v, a liquid inlet 23h is provided to be used for injection of the electrolyte 27 into the battery case 20 and is hermetically sealed with a sealing member 25.

Near both ends of the lid member 23 in its longitudinal direction, there are fixedly provided the positive terminal member 60 and the negative terminal member 70 each extending out of the battery case 20. To be concrete, the positive terminal member 60 and the negative terminal member 70 are connected to the electrode body 30 within the battery case 20 and respectively include first terminal members 61 and 71 extending through the lid member 23 to the outside of the battery case 20 and crank-shaped second terminal members 62 and 72 placed on the lid member 23 and fixed by caulking to the corresponding first terminal members 61 and 71.

The first terminal member 61 of the positive terminal member 60 has a rectangular plate-like terminal connecting portion 61j connected (welded) to a positive-electrode connecting portion 30cj of a positive-electrode protruding wound part 30c of the electrode body 30 which will be described later. Further, the first terminal member 71 of the negative terminal member 70 has a rectangular plate-like terminal connecting portion 71j connected (welded) to a negative-electrode connecting portion 30dj of a negative-electrode protruding wound part 30d of the electrode body 30. The positive terminal member 60 and the negative terminal member 70 are respectively fixed to the lid member 23 along with metal fastening members 65 and 75 for fastening external connecting terminals outside the battery such as a bus bar and a crimping terminal, by way of first insulating members 67 and 77 made of resin and placed inside the lid member 23 (case inside) and second insulating members 68 and 78 made of resin and placed outside the lid member 23 (case outside).

The electrode body 30 will be explained below (see FIGS. 2 and 4 to 7). This electrode body 30 is accommodated in a sideways position in the battery case 20 so that an axis (a winding axis) AX of the electrode body 30 is parallel to the battery lateral direction CH (see FIG. 2). This electrode body 30 is assembled in such a way that a strip-shaped positive electrode sheet 31 and a strip-shaped negative electrode sheet 41 are overlapped by interposing two strip-shaped separators 51, 51 made of porous resin (see FIG. 7), and wound about an axis AX and compressed in a flat shape (see FIGS. 5 and 6).

The positive electrode sheet 31 has a core member consisting of a strip-shaped positive electrode foil 32 made of aluminum. A part (an upper part in FIGS. 5 and 7) of this positive electrode foil 32 in the width direction (an up and down direction in FIGS. 5 and 7) forms an exposed portion 32m in which the positive electrode foil 32 is exposed and extends in a strip shape in a longitudinal direction (a right and left direction in FIG. 7). On the other hand, both main surfaces (a lower part in FIGS. 5 and 7) other than the exposed portion 32m are formed with positive active material layers 33, 33 each extending in a strip shape in the longitudinal direction. Each of the positive active material layers 33 is made of positive active material, conductive material, and binder. In the present embodiment, the positive active material employs lithium-nickel-cobalt-manganese composite oxide, the conductive material employs acetylene black (AB), and the binder employs polyvinylidene fluoride (PVDF).

The negative electrode sheet 41 has a core member consisting of a strip-shaped negative electrode foil 42 made of copper. A part (a lower part in FIGS. 5 and 7) of this negative electrode foil 42 in the width direction (the up and down direction in FIGS. 5 and 7) forms an exposed portion 42m in which the negative electrode foil 42 is exposed and extends in a strip shape in a longitudinal direction (the right and left direction in FIG. 7). On the other hand, both main surfaces (an upper part in FIGS. 5 and 7) other than the exposed portion 42m are formed with negative active material layers 43, 43 each extending in a strip shape in the longitudinal direction. Each of the negative active material layers 43 is made of negative active material, binder, and thickener. In the present embodiment, the negative active material employs natural graphite, the binder employs styrene-butadiene rubber (SBR), and the thickener employs carboxymethyl cellulose (CMC).

An edge portion 31c (part of the exposed portion 32m on an edge side) located on one side LA in a width direction LH of the positive electrode sheet 31 protrudes in a flat spiral form from the separators 51 toward a first side EC (a left side in FIG. 2 and an upper side in FIGS. 5 and 7) in the axial direction EH, forming a positive-electrode protruding wound part 30c of the electrode body 30. Further, an edge portion 41c (part of the exposed portion 42m on an edge side) located on one side MA in the width direction MH of the negative electrode sheet 41 protrudes in a flat spiral form from the separators 51 toward a second side ED (a right side in FIG. 2 and a lower side in FIGS. 5 and 7) in the axial direction EH, forming a negative-electrode protruding wound part 30d of the electrode body 30. A portion positioned between the positive-electrode protruding wound part 30c and the negative-electrode protruding wound part 30d corresponds to a main part 30e of the electrode body 30. Accordingly, when seen in the axial direction EH, this electrode body 30 consists of the positive-electrode protruding wound part 30c, the negative-electrode protruding wound part 30d, and the main part 30e (see FIGS. 5 and 2).

Also, when seen in the electrode body width direction GH, the electrode body 30 consists of a first-side curved end part 30f, a second-side curved end part 30g, and a central part 30h (see FIGS. 5, 6, and 4). Concretely, the first-side curved end part 30f is a portion located on a first side GA (a lower side in FIGS. 2, 4, and 6) in the electrode body width direction GH, in which the positive electrode sheet 31, the negative electrode sheet 41, and the separators 51 are curved in a semi-cylindrical shape and overlapped one on another. The second-side curved end part 30g is a portion located on a second side GB (an upper side in FIGS. 2, 4, and 6) in the electrode body width direction GH, and the positive electrode sheet 31, the negative electrode sheet 41, and the separators 51 are curved in a semi-cylindrical shape and overlapped one on another. The central part 30h is a flat portion located between the first-side curved end part 30f and the second-side curved end part 30g. Such an electrode body 30 is accommodated in the battery case 20 so that the electrode body width direction GH intersects with the lid member 23 and the second-side curved end part 30g is closer to the lid member 23 than the first-side curved end part 30f (see FIGS. 2 and 4).

A dimension Hd of the electrode body 30 in the electrode body width direction GH is Hd=54 mm. A thickness Wa (a dimension in the electrode body thickness direction FH) of the electrode body 30 is Wa=12 mm. A dimension of the electrode body 30 in the axial direction EH is 130 mm. Furthermore, a dimension (diameter) Hf of each of the semi-cylindrical first-side curved end part 30f and the semi-cylindrical second-side curved end part 30g in the electrode body width direction GH is half (Hf=0.5Wa) of the thickness Wa of the electrode body 30, i.e., Hf=6 mm. Accordingly, a dimension He of the central part 30h in the electrode body width direction GH is He=Hd−2Hf=Hd−Wa=42 mm.

In the above-described electrode body 30, a portion of the electrode body 30 apt to cause a short circuit, that is, a portion located at an innermost circumferential position of the overlapping portions of the positive electrode sheet 31 and the negative electrode sheet 41 by interposing the separators 51 (i.e., a portion including a positive-electrode innermost curved portion 31r, a negative-electrode facing portion 41r, and a separator facing portion 51r, which will be described later) is placed in the first-side curved end part 30f of the two curved end parts 30f and 30g (see FIG. 6).

The positive-electrode innermost curved portion 31r is a part of the positive electrode sheet 31, which is curved with a smallest radius curvature (a largest curvature), this innermost curved portion 31r having been bent first from a winding start point following dead turn winding. Further, the negative-electrode facing portion 41r is a part of the negative electrode sheet 41, which is located radially inside of the positive-electrode innermost curved portion 31r and faces this innermost curved portion 31r through the separator 51 (the separator facing portion 51r). The separator facing portion 51r is a part of the separator 51, interposed between the positive-electrode innermost curved portion 31r and the negative-electrode facing portion 41r. The negative electrode sheet 41 and the separators 51 are designed with respective dimensions in the longitudinal direction longer than the positive electrode sheet 31. In a section located on the most inside of the electrode body 30 in the radial direction, a dead-turn portion 41z of the negative electrode sheet 41 and a dead-turn portion 51z of each separator 51, each of which does not face the positive electrode sheet 31, are present (see FIG. 6).

The following explanation is given to connection of the electrode body 30 to the positive terminal member 60 and the negative terminal member 70 (see FIGS. 2 and 4). To the positive-electrode connecting portion 30cj of the positive-electrode protruding wound part 30c of the electrode body 30, a rectangular plate-like 61j of the positive terminal member 60 is connected. Concretely, the positive-electrode connecting portion 30cj consists of all of rectangular plate-like overlapping portions 31ck of the edge portion 31c of the positive electrode sheet 31 forming the flat, spiral, positive-electrode protruding wound part 30c, the overlapping portions 31ck overlapping the terminal connecting portion 61j when seen in the electrode body thickness direction FH (i.e., overlapping the terminal connecting portion 61j when the terminal connecting portion 61j is projected in the electrode body thickness FH). The rectangular plate-like overlapping portions 31ck are bound together into a bundle to overlap one another and integrally welded to the terminal connecting portion 61j. A dimension Hc of this positive-electrode connecting portion 30cj in the electrode body width direction GH is Hc=17 mm. The dimension He of the central part 30h of the electrode body 30 in the electrode body width direction GH is He=42 mm as mentioned above, so that Hc=0.40He and this value meets a relation of Hc≤0.5He.

A dimension (a distance Ha) in the electrode body width direction GH from the positive-electrode connecting portion 30cj to an end 30ft of the first-side curved end part 30f of the electrode body 30 on the first side GA in the electrode body width direction GH is a distance Ha=23 mm. Further, a dimension (a distance Hb) in the electrode body width direction GH from the positive-electrode connecting portion 30cj to an end 30gt of the second-side curved end part 30g of the electrode body 30 on the second side GB in the electrode body width direction GH is a distance Hb=14 mm. In the present embodiment, accordingly, those distance Ha and distance Hb are expressed by Ha=1.64Hb, satisfying a relation of Ha≥1.1Hb. In addition, a relation of Ha≤2.5Hb is also satisfied. Since the thickness Wa of the electrode body is Wa=12 mm as described above, the following relations are satisfied; Ha=1.92Wa, Hb=1.17Wa, Ha≥Wa and Hb≥Wa.

On the other hand, the negative-electrode connecting portion 30dj of the negative-electrode protruding wound part 30d of the electrode body 30 is connected to the rectangular plate-like terminal connecting portion 71j of the negative terminal member 70. Concretely, the negative-electrode connecting portion 30dj consists of all of rectangular plate-like overlapping portions 41ck of the edge portion 41c of the negative electrode sheet 41 forming the flat, spiral, negative-electrode protruding wound part 30d, the overlapping portions 41ck overlapping the terminal connecting portion 71j when seen in the electrode body thickness direction FH (i.e., overlapping the terminal connecting portion 71j when the terminal connecting portion 71j is projected in the electrode body thickness direction FH). The rectangular plate-like overlapping portions 41ck are bound together into a bundle to overlap one another and integrally welded to the terminal connecting portion 71j.

A method of manufacturing the above-described battery 10 will be explained below. Firstly, the electrode body 30 is produced. Specifically, the positive electrode sheet 31, the negative electrode sheet 41, and two sheets of the separators 51, 51 are prepared, and the positive electrode sheet 31 and the negative electrode sheet 41 are overlapped by alternately interposing the separators 51, 51 therebetween (see FIG. 7), and wound around a winding core about the axis AX. Thereafter, this wound body is compressed into a flat shape to form the electrode body 30. At that time, as described above, one of the two curved end parts 30f and 30g, the one including a portion located on an innermost circumference among the overlapping portions of the positive electrode sheet 31 and the negative electrode sheet 41 with the separators 51 interposed therebetween (i.e., a portion consisting of the positive-electrode innermost curved portion 31r, the negative-electrode facing portion 41r, and the separator facing portion 51r) is referred to as a first-side curved end part 30f (see FIG. 6).

In addition, the lid member 23, the first terminal members 61 and 71, the second terminal members 62 and 72, the fastening members 65 and 75, the first insulating members 67 and 77, and the second insulating members 68 and 78 are separately prepared. Using them, the positive terminal member 60 and the negative terminal member 70 are each fixed to the lid member 23 (see FIG. 3).

Successively, the positive terminal member 60 and the negative terminal member 70 are separately connected to the electrode body 30. To be concrete, the terminal connecting portion 61j of the positive terminal member 60 and all the positive-electrode overlapping portions 31ck overlapping the terminal connecting portion 61j in the electrode body thickness direction FH, of the edge portion 31c of the positive electrode sheet 31 forming the flat spiral positive-electrode protruding wound part 30c, are pressed in the electrode body thickness direction FH. Thereby, all the overlapping portions 31ck overlapping one another and bound together into a bundle are welded to the terminal connecting portion 61j (see FIG. 4). The positive-electrode connecting portion 30cj is thus formed in the positive-electrode protruding wound part 30c. This positive-electrode connecting portion 30cj is placed in a position defined by the distance Ha=23 mm and the distance Hb=14 mm (Ha=1.64Hb).

Furthermore, the terminal connecting portion 71j of the negative terminal member 70 and all the overlapping portions 41ck overlapping the terminal connecting portion 71j in the electrode body thickness direction FH, of the edge portion 41c of the negative electrode sheet 41 forming the flat spiral negative-electrode protruding wound part 30d, are pressed in the electrode body thickness direction FH. Thereby, all the overlapping portions 41ck overlapping one another and bound together into a bundle are welded to the terminal connecting portion 71j (see FIG. 2). The negative-electrode portion 30dj is thus formed in the negative-electrode protruding wound part 30d.

Subsequently, the case body 21 is prepared, the electrode body 30 is put in this case body 21, and then the case body 21 is welded to the lid member 23 to complete the battery case 20 (see FIGS. 1 and 2). Thereafter, the electrolyte 27 is poured in the battery case 20 through the liquid inlet 23h and then the liquid inlet 23h is hermetically sealed with the sealing member 25. After that, this battery is subjected to initial charge and various examinations. The battery 10 is thus completed.

EXAMPLES AND COMPARATIVE EXAMPLES

Next, an explanation is given to the results of an examination conducted to verify the advantages of the battery 10 of the present embodiment. As Example 3, the battery 10 of the present embodiment was prepared. In this battery 10, as described above, the distance Ha from the positive-electrode connecting portion 30cj to the end 30ft on the first side GA in the electrode body width direction GH of the electrode body 30 is Ha=23 mm, the distance Hb to the end 30gt on the second side GB is Hb=14 mm, and Ha=1.64Hb (Ha/Hb=1.64). The electrode body 30 is accommodated in the battery case 20 so that the first-side curved end part 30f including the positive-electrode innermost curved portion 31r is positioned on a side close to a bottom 20w of the battery case 20 (the second-side curved end part 30g is positioned on a side close to the lid member 23 of the battery case 20). In Table, this is indicated as "Bottom Side" on a column "Position of First-side curved end part".

As Examples 1, 2, 4, and 5, there are prepared batteries similar to the battery 10 of Example 3 (the present embodiment) except for the distances Ha and Hb. In Example 1, the distance Ha=20 mm and the distance Hb=17 mm (Ha/Hb=1.18). In Example 2, the distance Ha=21 mm and the distance Hb=16 mm (Ha/Hb=1.31). In Example 4, the distance Ha=26 mm and the distance Hb=11 mm (Ha/Hb=2.36). In Example 5, the distance Ha=28 mm and the distance Hb=9 mm (Ha/Hb=3.11).

As Examples 6 to 9, there are prepared batteries in each of which the first-side curved end part is placed on the lid member side (the second-side curved end part is placed on the bottom side), inversely to Examples 1 to 5. In Table, this is indicated as "Lid-member Side" on the column "Position of First-side curved end part". It is to be noted that in Example 6, corresponding to Example 1, the distance Ha=20 mm and the distance Hb=17 mm (Ha/Hb=1.18). In Example 7, the distance Ha=22 mm and the distance Hb=15 mm (Ha/Hb=1.47). In Example 8, corresponding to Example 4, the distance Ha=26 mm and the distance Hb=11 mm (Ha/Hb=2.36). In Example 9, corresponding to Example 5, the distance Ha=28 mm and the distance Hb=9 mm (Ha/Hb=3.11).

On the other hand, as Comparative example 1, a battery similar to the battery 10 of Example 3 except for Ha=Hb=18.5 mm (Ha/Hb=1.00) was prepared. As Comparative example 2, a battery similar to the battery 10 of Example 3 except for the distance Ha=17 mm and the distance Hb=20 mm was prepared. As Comparative example 3, inversely to Comparative example 2, a battery with the first-side curved end part placed on the lid member side was prepared. As Comparative example 4, a battery was prepared in which the distance Ha=14 mm and the distance Hb=23 mm (Ha/Hb=0.61) and the first-side curved end part was placed on the lid member side.

Examples 1 to 9 and Comparative examples 1 to 4 were subjected to an "overcharge test" and then respective maximum temperatures were measured. To be concrete, the batteries were overcharged at a current value of 5 C (20 A) until respective battery voltage reached 15V, and then shifted to constant voltage charge (CV charge) to continue power supply. Then, the highest temperature (° C.) of each battery was measured. The battery temperature was measured in such a manner that a T-shaped thermocouple was attached to wide side surfaces of each battery case.

TABLE 1

| | Distance Ha (mm) | Distance Hb (mm) | Ha/Hb | Position of First-side curved part | Battery Highest Temperature (° C.) |
|---|---|---|---|---|---|
| Example 1 | 20 | 17 | 1.18 | Bottom Side | 115 |
| Example 2 | 21 | 16 | 1.31 | Bottom Side | 114 |
| Example 3 | 23 | 14 | 1.64 | Bottom Side | 110 |
| Example 4 | 26 | 11 | 2.36 | Bottom Side | 119 |

TABLE 1-continued

| | Distance Ha (mm) | Distance Hb (mm) | Ha/Hb | Position of First-side curved part | Battery Highest Temperature (° C.) |
|---|---|---|---|---|---|
| Example 5 | 28 | 9 | 3.11 | Bottom Side | 129 |
| Example 6 | 20 | 17 | 1.18 | Lid-member Side | 119 |
| Example 7 | 22 | 15 | 1.47 | Lid-member Side | 115 |
| Example 8 | 26 | 11 | 2.36 | Lid-member Side | 122 |
| Example 9 | 28 | 9 | 3.11 | Lid-member Side | 130 |
| Comparative example 1 | 18.5 | 18.5 | 1.00 | Bottom Side | 127 |
| Comparative example 2 | 17 | 20 | 0.85 | Bottom Side | 140 |
| Comparative example 3 | 17 | 20 | 0.85 | Lid-member Side | 137 |
| Comparative example 4 | 14 | 23 | 0.61 | Lid-member Side | 138 |

As revealed from Table 1, regarding the batteries of Examples 1 to 4 and 6 to 8, respective battery highest temperatures in the overcharge test were as low as 110 to 122° C. The reason thereof is considered as below. Specifically, as described above, in welding the terminal connecting portion of the positive terminal member to the positive-electrode protruding wound part of the electrode body to form the positive-electrode connecting portion, when the edge portion of the positive electrode sheet forming the positive-electrode protruding wound part is pressed in the electrode body thickness direction FH and bound in a bundle, the separators are subjected to stress and pulled toward the positive-electrode connecting portion in the longitudinal direction KH. However, in those batteries, the positive-electrode innermost curved portion is located appropriately apart from the positive-electrode connecting portion, so that the stress (tensile stress applied to the separators in the longitudinal direction KH) acting on the separator facing portion (especially, on the side close to the positive-electrode protruding wound part) of the separator that faces the positive-electrode innermost curved portion is small. Therefore, this separator facing portion will less shrink when the temperature increases.

Accordingly, in case the electrode body abnormally generates heat in the overcharge test, it is possible to prevent the separator facing portion of the separator facing the positive-electrode innermost curved portion (especially on the side close to the positive-electrode protruding wound part) from largely shrinking due to heat in a separator width direction JH (the axial direction EH of the electrode body) in the positive-electrode innermost curved portion. This can appropriately prevent a short circuit between the positive-electrode innermost curved portion and the negative-electrode facing portion of the negative electrode sheet facing thereto from occurring even in the positive-electrode innermost curved portion on the side close to the positive-electrode protruding wound part (on the first side EC in the axial direction EH), in which a short circuit is most likely to occur. Consequently, the battery highest temperature is presumed to have been kept low.

The reason why the battery highest temperature in Example 2 is lower than in Example 1 is conceived because the battery of Example 2 is larger in Ha/Hb value and the positive-electrode connecting portion is located more apart from the positive-electrode innermost curved portion. Similarly, the reason why the battery highest temperature in Example 3 is lower than in Example 2 is conceived because the battery of Example 3 is larger in Ha/Hb value and the positive-electrode connecting portion is located more apart from the positive-electrode innermost curved portion.

On the other hand, the reason why the battery highest temperature in Example 4 is higher than in Example 3 is conceived because the battery of Example 4 is too large in Ha/Hb value and thus conversely a short circuit is more likely to occur in the second-side curved end part (especially, the innermost circumferential portion thereof). Specifically, in the battery of Example 4, the positive-electrode connecting portion is positioned greatly away from the first-side curved end part (the positive-electrode innermost curved portion), whereas it is too close to the second-side curved end part. Thus, it is conceived that a short circuit is less likely to occur in the first-side curved end part (the positive-electrode innermost curved portion), while a short circuit is more likely to occur in the second-side curved end part (especially, the innermost circumferential portion thereof). Similarly, it is conceived that the battery highest temperature in Example 5 is higher than in Example 4 because the battery of Example 5 is too large in Ha/Hb value and thus conversely a short circuit is more likely to occur in the second-side curved end part (especially, the innermost circumferential portion thereof).

The reason why the battery highest temperature in Example 7 is lower than in Example 6 is conceived because the battery of Example 7 is larger in Ha/Hb value and the positive-electrode connecting portion is located more apart from the positive-electrode innermost curved portion. On the other hand, the reason why the battery highest temperature is higher in the ascending order of Example 7, Example 8, and Example 9 is conceived because the battery of Example 8 is larger in Ha/Hb value and further the battery of Example 9 is too large, and thus conversely a short circuit is more likely to occur in the second-side curved end part (especially, the innermost circumferential portion thereof).

Moreover, the battery highest temperature in Example 1 is lower as compared with Example 6 equal in Ha/Hb value to that in Example 1. This is conceivably because, in the battery of Example 1, the first-side curved end part is positioned on the bottom side (the second-side curved end part is positioned on the lid member side) and thus the dimension of the positive terminal member (the first terminal member) from the positive-electrode connecting portion to the lid member is short, so that the heat could be released out of the battery through the positive terminal member having a shorter dimension. This is supported by comparison between Example 4 and Example 8 equal in Ha/Hb value to each other, showing that the battery highest temperature is lower in Example 4, and comparison between Example 5 and Example 9 equal in Ha/Hb value to each other, showing that the battery highest temperature is lower in Example 5.

On the other hand, each of the batteries of Comparative examples 1 to 4 provided a battery highest temperature as high as 127 to 140° C. in the overcharge test. This reason is presumed as below. Specifically, when the electrode body abnormally generates heat by overcharge due to heat increase/accumulation or relatively low heat conductivity of the positive electrode sheet, as described above, a short circuit is most likely to occur in a part of the positive-electrode innermost curved portion, located on the side close to the positive-electrode protruding wound part. Furthermore, in welding the terminal connecting portion of the positive terminal member to the positive-electrode protruding wound part of the electrode body to form the positive-electrode connecting portion, when the edge portion of the positive electrode sheet forming the positive-electrode protruding wound part is pressed in the electrode body thickness direction FH and bound in a bundle, the separators are subjected to stress and pulled toward the positive-electrode connecting portion in the longitudinal direction. Therefore, if the positive-electrode innermost curved portion is present near the positive-electrode connecting portion, large stress (tensile stress acting on the separator in the longitudinal direction) is generated in the separators (especially, on the side close to the positive-electrode protruding wound part in the axial direction of the electrode body) facing the positive-electrode innermost curved portion. Such a stress-generated portion of the separator will shrink to remove the stress and return to a previous state before drawing as the temperature increases. It is consequently considered that, if this shrinkage is large, the positive-electrode innermost curved portion of the positive electrode sheet (especially, on a side close to the positive-electrode protruding wound part in the axial direction of the electrode body) touches the opposed negative electrode sheet thereto may contact each other, resulting in the occurrence of a short circuit.

Next, as Examples 10 to 13 and Comparative examples 5 to 7, batteries were prepared under the condition that the dimension Hd of the electrode body in the electrode body width direction GH was changed from Hd=54 mm described above to Hd=84 mm and the dimension in the axial direction EH was changed from 130 mm described above to 105 mm, and the thickness Wa (=12 mm) was unchanged. Furthermore, the battery of Example 10 had the distance Ha=35 mm and the distance Hb=30 mm (Ha/Hb=1.17). The battery of Example 11 had the distance Ha=45 mm and the distance Hb=20 mm (Ha/Hb=2.25). The battery of Example 12 had the distance Ha=53 mm and the distance Hb=12 mm (Ha/Hb=4.42). In each of the batteries of Examples 10 to 12, the first-side curved end part was placed on the bottom side of the battery case. In the battery of Example 13, inversely to Example 10, the first-side curved end part was placed on the lid member side of the battery case.

On the other hand, the battery of Comparative example 5 had the distance Ha=32.5 mm and the distance Hb=32.5 mm (Ha/Hb=1.00). The battery of Comparative example 6 had the distance Ha=30 mm and the distance Hb=35 mm (Ha/Hb=0.85). In each of the batteries of Comparative examples 5 and 6, the first-side curved end part was placed on the bottom side of the battery case. In the battery of Comparative example 7, inversely to Comparative example 6, the first-side curved end part was placed on the lid member side of the battery case.

TABLE 2

| | Distance Ha (mm) | Distance Hb (mm) | Ha/Hb | Position of Fist-side curved part | Battery Highest Temperature (° C.) |
|---|---|---|---|---|---|
| Example 10 | 35 | 30 | 1.17 | Bottom Side | 124 |
| Example 11 | 45 | 20 | 2.25 | Bottom Side | 120 |
| Example 12 | 53 | 12 | 4.42 | Bottom Side | 130 |
| Example 13 | 35 | 30 | 1.17 | Lid-member Side | 126 |
| Comparative example 5 | 32.5 | 32.5 | 1.00 | Bottom Side | 133 |
| Comparative example 6 | 30 | 35 | 0.85 | Bottom Side | 145 |
| Comparative example 7 | 30 | 35 | 0.85 | Lid-member Side | 140 |

Subsequently, each of the batteries of Examples 10 to 13 and Comparative examples 5 to 7 were subjected to the aforementioned "overcharge test" and respective battery highest temperatures (° C.) were measured. However, a current value for overcharge was set to 4 C. Measurement results are shown in Table 2. As revealed from Table 2, regarding the batteries of Examples 10, 11, and 13, respective battery highest temperatures in the overcharge test were as low as 120 to 126° C. The reason thereof is considered to be the same as the reason that the battery highest temperature of each battery of Examples 1 to 5, 7, and 8 was kept low in the overcharge test.

The reason why the battery highest temperature in Example 11 is lower than in Example 10 is conceived because the battery of Example 11 is larger in Ha/Hb value and the positive-electrode connecting portion is located more apart from the positive-electrode innermost curved portion. On the other hand, the reason why the battery highest temperature in Example 12 is higher than in Example 11 is conceived because the battery of Example 12 is too large in Ha/Hb value and thus conversely a short circuit is more likely to occur in the second-side curved end part (especially, the innermost circumferential portion thereof). Comparing Example 10 and Example 13 equal in Ha/Hb value to each other, the battery highest temperature is lower in Example 10. This is conceived because, in the battery of Example 10, the first-side curved end part is located on the bottom side and thus the dimension of the positive terminal member from the positive-electrode connecting portion to the lid member is short, so that the heat could be released out of the battery through the positive terminal member having a shorter dimension.

On the other hand, each of the batteries of Comparative examples 5 to 7 provided a battery highest temperature as high as 133 to 145° C. in the overcharge test. This reason is presumed to be equal to the reason that each battery of above-described Comparative examples 1 to 4 provided a high battery highest temperature in the overcharge test.

In the battery 10, as explained above, the positive-electrode connecting portion 30cj of the positive-electrode protruding wound part 30c of the electrode body 30, connected to the terminal connecting portion 61j of the positive terminal member 60, is placed appropriately apart from the positive-electrode innermost curved portion 31r of the positive electrode sheet 31. To be concrete, the positive-electrode innermost curved portion 31r is placed in the first-side curved end part 30f, out of the two curved end parts 30f and 30g of the electrode body 30, and the positive-electrode connecting portion 30cj is placed in a position in which the relation that the distance Ha from the positive-electrode connecting portion 30cj to the end 30ft of the electrode body 30 on the first side GA in the electrode body width direction GH and the distance Hb from the positive-electrode connecting portion 30cj to the end 30gt of the electrode body 30 on the second side GB in the electrode body width direction GH satisfies a relation of Ha≥1.1Hb.

As described above, in welding the terminal connecting portion 61j of the positive terminal member 60 to the positive-electrode protruding wound part 30c of the electrode body 30 to form the positive-electrode connecting portion 30cj, when the edge portion 31c of the positive electrode sheet 31 forming the positive-electrode protruding wound part 30c is pressed in the electrode body thickness direction FH and bound in a bundle, the separators 51 are subjected to stress and pulled toward the positive-electrode connecting portion 30cj in the longitudinal direction KH. In this battery 10, however, the positive-electrode innermost curved portion 31r is located appropriately apart from the positive-electrode connecting portion 30cj, so that the stress (tensile stress applied to the separator 51 in the longitudinal direction KH) acting on the separator facing portion 51r (especially, on the side close to the positive-electrode protruding wound part 30c in the axial direction EH of the electrode body 30) of the separator 51 that faces the positive-electrode innermost curved portion 31r is small. Therefore, this separator facing portion 51r will less shrink when the temperature increases.

Accordingly, in case the electrode body 30 abnormally generates heat, it is possible to prevent the separator facing portion 51r of the separator 51 facing the positive-electrode innermost curved portion 31r (especially, on the side close to the positive-electrode protruding wound part 30c) from greatly shrinking due to heat in the width direction JH (the axial direction EH of the electrode body 30) in the positive-electrode innermost curved portion 31r. This can appropriately prevent a short circuit between the positive-electrode innermost curved portion 31r and the negative-electrode facing portion 41r of the negative electrode sheet 41 facing thereto from occurring in the positive-electrode innermost curved portion 31r on the side close to the positive-electrode protruding wound part 30c (on the first side EC in the axial direction EH), in which a short circuit is most likely to occur.

In the battery 10, meanwhile, the electrode body 30 may be arranged in the battery case 20 so that the first-side curved end part 30f is placed on the side close to the lid member 23 (i.e., the electrode body width direction GH intersects the lid member 23 and the first-side curved end part 30f is located closer to the lid member 23 than the second-side curved end part 30g). However, it is more preferable to arrange the electrode body 30 in the battery case 20 in a configuration, like the battery 10, that the second-side curved end part 30g is placed on the side close to the lid member 23 (i.e., that the electrode body width direction GH intersects the lid member 23 and the second-side curved end part 30g is located closer to the lid member 23 than the first-side curved end part 30f).

As described above, the distance Ha from the positive-electrode connecting portion 30cj to which the terminal connecting portion 61j of the positive terminal member 60 is connected to the end 30ft of the electrode body 30 on the first side GA is longer than the distance Hb from the positive-electrode connecting portion 30cj to the end 30gt of the electrode body 30 on the second side GB (concretely, Ha≥1.1Hb). That is, the distance Hb is shorter than the distance Ha. Accordingly, as compared with the configuration that the one-side curved end part 30f is placed on the lid member 23 side, the configuration that the second-side curved end part 30g is placed on the lid member 23 side enables reducing the dimension of the positive terminal member 60 (the first terminal member 61) from the positive-electrode connecting portion 30cj to the lid member 23, thus releasing heat to the outside through the shorter positive terminal member 60, resulting in excellent heat dissipation property.

Furthermore, if the distance Ha is too larger than the distance Hb, that is, the positive-electrode connecting portion 30cj connected to the positive terminal member 60 is far away from the first-side curved end part 30f (the positive-electrode innermost curved portion 31r) while is too close to the second-side curved end part 30g, a short circuit is less likely to occur in the positive-electrode innermost curved portion 31r positioned in the first-side curved end part 30f. However, a short circuit is likely to occur in the second-side curved end part 30g (especially, the innermost circumferential portion thereof). For addressing this undesired matter, in the battery 10, the distance Ha and the distance Hb are set to satisfy a relation of Ha≤2.5 Hb. This can appropriately prevent the occurrence of a short circuit in the first-side curved end part 30f (especially, the positive-electrode innermost curved portion 31r) of the electrode body 30 and also appropriately prevent the occurrence of a short circuit in the second-side curved end part 30g (especially, the innermost circumferential portion thereof) of the electrode body 30, thus enabling preventing the occurrence of a short circuit in the electrode body 30 in a balanced manner.

If the dimension Hc of the positive-electrode connecting portion 30cj in the electrode body width direction GH is set too large, the distance Ha and the distance Hb are made shorter and thus a short circuit is likely to occur in the first-side curved end part 30f (especially, the positive-electrode innermost curved portion 31r) and the second-side curved end part 30g (especially, the innermost circumferential portion thereof) of the electrode body 30. For avoiding such a defect, the battery 10 is designed such that the dimension Hc of the positive-electrode connecting portion 30cj in the electrode body width direction GH is set to satisfy a relation of Hc≤0.5He with respect to the dimension He of the central part 30h of the electrode body 30 in the electrode body width direction GH. Accordingly, the distance Ha and the distance Hb can be appropriately set long. This makes it possible to more appropriately prevent the occurrence of a short circuit in the first-side curved end part 30f (especially, the positive-electrode innermost curved portion 31r) and the second-side curved end part 30g (especially, the innermost circumferential portion thereof) of the electrode body 30.

Moreover, if the above-described distances Ha and Hb are set too shorter than the thickness Wa of the electrode body 30, a short circuit is made more likely to occur in the first-side curved end part 30f (especially, the positive-electrode innermost curved portion 31r) and the second-side curved end part 30g (especially, the innermost circumferential portion thereof) of the electrode body 30. In the battery 10, therefore, the distance Ha and the distance Hb are set to satisfy a relation of Ha≥Wa and Hb≥Wa. This relation can ensure the distance Ha and the distance Hb with sufficient dimensions. Accordingly, it is possible to more appropriately prevent the occurrence of a short circuit in the first-side curved end part 30 (especially, the positive-electrode innermost curved portion 31r) and the second-side curved end part 30g (especially, the innermost circumferential portion thereof) of the electrode body 30.

In the battery 10, furthermore, the positive-electrode connecting portion 30cj of the positive-electrode protruding wound part 30c consists of all the overlapping portions 31ck overlapping the terminal connecting portion 61j of the positive terminal member 60 when seen in the electrode body thickness direction FH, out of the edge portion 31c of the positive electrode sheet 31 forming the flat spiral positive-electrode protruding wound part 30c. These overlapping portions 31ck are all bound together in a bundle and welded to the terminal connecting portion 61j. In the battery 10, when the terminal connecting portion 61j of the positive terminal member 60 is to be welded to the positive-electrode protruding wound part 30c, particularly large stress (tensile stress applied on the separator 51 in the longitudinal direction KH) is likely applied to the separator facing portion 51r of the separator 51 facing the positive-electrode innermost curved portion 31r. In case the electrode body 30 abnormally generates heat, therefore, the separator facing portion 51r is liable to largely shrink. For avoiding this, the battery 10 is configured as described above such that the positive-electrode innermost curved portion 31r is placed in the first-side curved end part 30f of the electrode body 30 and further the positive-electrode connecting portion 30cj is positioned to satisfy a relation of Ha≥1.1Hb. Even if the above configuration is adopted, accordingly, it is possible to prevent the separator facing portion 51r facing the positive-electrode innermost curved portion 31r from largely shrinking and appropriately prevent the occurrence of a short circuit between the positive-electrode innermost curved portion 31r and the negative-electrode facing portion 41r opposed thereto.

The present invention is explained as above in the embodiment, but is not limited thereto. The present invention may be embodied in other specific forms without departing from the essential characteristics thereof.

REFERENCE SIGNS LIST

10 Battery
20 Battery case
23 Lid member (Terminal fixing wall part)
30 Electrode body
30c Positive protruding wound part
30cj Positive-electrode connecting portion
30d Negative protruding wound part
30e Main part
30f First-side curved end part
30ft End (of First-side curved end part)
30g Second-side curved end part
30gt End (of Second-side curved end part)
30h Central part
31 Positive electrode sheet
31c Edge portion (of Positive electrode sheet on one side)
31ck Overlapping portion (of Edge portion)
31r Positive innermost curved portion
41 Negative electrode sheet
41c Edge portion (of Negative electrode sheet on one side)
41r Negative-electrode facing portion
51 Separator
51r Separator facing portion
60 Positive terminal member
70 Negative terminal member
61, 71 First terminal member
61j, 71j Terminal connecting portion (of First terminal member)
AX Axis (Winding axis)
EH Axial direction
EC First side (in axial direction)
ED Second side (in axial direction)
FH Electrode thickness direction
GH Electrode width direction
GA First side (in electrode body width direction)
GB Second side (in electrode body width direction)
JH Width direction (of Separator)
KH Longitudinal direction (of Separator)
LH Width direction (of Positive electrode sheet)
LA One side (of Positive electrode sheet in width direction)
Ha Distance (from Positive-electrode connecting portion to end on first side in electrode body width direction)
Hb Distance (from Positive-electrode connecting portion to end on second side in electrode body width direction)
Hc Dimension (of Positive-electrode connecting portion in electrode body width direction)
Hd Dimension (of Electrode body in electrode body width direction)
He Dimension (of Central part in electrode body width direction)
Hf Dimension (of First-side curved end part and second-side curved end part in electrode body width direction)
Wa Thickness (of Electrode body)

The invention claimed is:

1. A battery comprising:
an electrode body including a strip-shaped positive electrode sheet and a strip-shaped negative electrode sheet having higher heat conductivity than the positive electrode sheet, the positive electrode sheet and the negative electrode sheet being overlapped and wound about an axis in a flat shape by interposing strip-shaped separators made of porous resin between the positive and negative electrode sheets, the electrode body having a positive-electrode protruding wound part that is formed of an edge portion of the positive electrode sheet on one side in a width direction and protrudes in a flat spiral form toward a first side in an axial direction; and
a positive terminal member having a terminal connecting portion connected to the positive-electrode protruding wound part of the electrode body,
wherein the electrode body being flat, includes:
a first-side curved end part located on a first side in an electrode body width direction intersecting the axial direction and an electrode body thickness direction, and formed of the positive electrode sheet, the negative electrode sheet, and the separators which are bent in a semi-cylindrical shape and overlapped one on another; and
a second-side curved end part located on a second side in the electrode body width direction and formed of the positive electrode sheet, the negative electrode sheet, and the separators which are bent in a semi-cylindrical shape and overlapped one on another,
wherein the positive electrode sheet includes a positive-electrode innermost curved portion bent at smallest radius curvature and placed in the first-side curved end part,
when a dimension in the electrode body width direction from a positive-electrode connecting portion of the positive-electrode protruding wound part connected to the terminal connecting portion to an end of the first-side curved end part of the electrode body on the first side in the electrode body width direction is defined as a distance Ha, and a dimension in the electrode body width direction from the positive-electrode connecting portion to an end of the second-side curved end part of the electrode body in the electrode body width direction is defined as a distance Hb,
the terminal connecting portion is connected to the positive-electrode connecting portion at a position where the distance Ha and the distance Hb satisfy a relation $2.51\text{Hb} \geq \text{Ha} \geq 1.1\text{Hb}$.

2. The battery according to claim 1, further comprising a battery case accommodating the electrode body and having a terminal fixing wall part to which the positive terminal member is fixed and extended through to outside,
wherein the electrode body is accommodated in the battery case in a configuration that the electrode body width direction intersects the terminal fixing wall part and the second-side curved end part is located on a side closer to the terminal fixing wall part than the first-side curved end part.

3. The battery according to claim 1, wherein
when a dimension of a central part of the electrode body in the electrode body width direction, the central part being located between the first-side curved end part and the second-side curved end part, is defined as a dimension He, and a dimension of the positive-electrode connecting portion in the electrode body width direction is defined as a dimension Hc, the dimension He is a value meeting a relation of Hc≤0.5He.

4. The battery according to claim 1, wherein
when a thickness of the electrode body is a thickness Wa, the distance Ha and the distance Hb satisfy a relation of Ha≥Wa and Hb≥Wa.

5. The battery according to claim 1, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

6. The battery according to claim 5, wherein
when a dimension of a central part of the electrode body in the electrode body width direction, the central part being located between the first-side curved end part and the second-side curved end part, is defined as a dimension He, and a dimension of the positive-electrode connecting portion in the electrode body width direction is defined as a dimension Hc, the dimension He is a value meeting a relation of Hc≤0.5He.

7. The battery according to claim 3, wherein
when a thickness of the electrode body is a thickness Wa, the distance Ha and the distance Hb satisfy a relation of Ha≥Wa and Hb≥Wa.

8. The battery according to claim 5, wherein
when a thickness of the electrode body is a thickness Wa, the distance Ha and the distance Hb satisfy a relation of Ha≥Wa and Hb≥Wa.

9. The battery according to claim 6, wherein
when a thickness of the electrode body is a thickness Wa, the distance Ha and the distance Hb satisfy a relation of Ha≥Wa and Hb≥Wa.

10. The battery according to claim 2, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

11. The battery according to claim 1, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

12. The battery according to claim 3, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

13. The battery according to claim 4, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

14. The battery according to claim 5, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

15. The battery according to claim 6, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

16. The battery according to claim 7, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

17. The battery according to claim 8, wherein the positive-electrode connecting portion of the positive-electrode protruding wound part consists of all of overlapping portions of the edge portion forming the positive-electrode protruding wound part having a flat spiral form, the overlapping portions overlapping the terminal connecting portion of the positive terminal member when seen in the electrode body thickness direction, and the overlapping portions are all bound together in a bundle and welded to the terminal connecting portion.

* * * * *